(12) United States Patent
Tottey et al.

(10) Patent No.: US 8,343,396 B2
(45) Date of Patent: Jan. 1, 2013

(54) INSULATING FOAM SECTIONS

(75) Inventors: John Tottey, Glossop (GB); David Anthony Oliver, Glossop (GB); Thomas McCabe, Kingscourt (IE)

(73) Assignee: Kingspan Holdings (IRL) Limited, Kingscourt, County Cavan (IE)

( * ) Notice: Subject to any disclaimer, the term of this patent is extended or adjusted under 35 U.S.C. 154(b) by 336 days.

(21) Appl. No.: 11/148,183

(22) Filed: Jun. 9, 2005

(65) Prior Publication Data

US 2005/0271841 A1 Dec. 8, 2005

Related U.S. Application Data

(63) Continuation of application No. PCT/IE03/00169, filed on Dec. 12, 2003.

(30) Foreign Application Priority Data

Dec. 12, 2002 (IE) .................................... 2002/0966

(51) Int. Cl.
*B32B 37/06* (2006.01)
(52) U.S. Cl. ......... 264/41; 264/45.2; 264/45.3; 425/403
(58) Field of Classification Search .................... 264/41, 264/45.2, 45.3; 425/403
See application file for complete search history.

(56) References Cited

U.S. PATENT DOCUMENTS

| | | | | |
|---|---|---|---|---|
| 2,608,720 A | * | 9/1952 | Meissner | 156/171 |
| 3,257,690 A | * | 6/1966 | Scott | 425/403 |
| 3,498,862 A | * | 3/1970 | Comastri et al. | 156/195 |
| 4,362,489 A | | 12/1982 | Bast | 425/127 |
| 5,973,018 A | | 10/1999 | Grinshpun et al. | 521/181 |

FOREIGN PATENT DOCUMENTS

| | | |
|---|---|---|
| DE | 4211402 A1 | 10/1992 |
| DE | 4118060 A1 | 12/1992 |
| EP | 0044468 | 1/1982 |
| EP | 0240072 | 10/1987 |
| FR | 2332483 | 6/1977 |
| GB | 956185 | 4/1964 |
| GB | 965185 | 7/1964 |
| GB | 1174639 | 12/1969 |
| GB | 1258278 | 12/1971 |
| GB | 1457182 | 12/1976 |
| GB | 2032845 A | 5/1980 |
| GB | 2130679 | 6/1984 |
| GB | 2296749 A | 7/1996 |
| GB | 2310679 A | 9/1997 |
| GB | 2370870 A | 7/2002 |
| JP | 10-299983 | 11/1998 |

* cited by examiner

*Primary Examiner* — Elizabeth Cole
(74) *Attorney, Agent, or Firm* — Jacobson Holman PLLC

(57) ABSTRACT

A pipe insulating section includes a generally cylindrical hollow phenolic foam body of substantially uniform cross section with an inner facing web and an outer facing web. The phenolic foam body is slit longitudinally to provide section halves which can be opened to facilitate wrapping around a pipe to insulate the pipe. The section halves are linked by the outer web at one side and facing ends of the section halves at the other end are faced with the inner facing web. The inner web may be of paper and the other web may be of an aluminum foil. An apparatus used in manufacturing the elongate shaped phenolic section includes an outer mold for forming the outer facing into a cylindrical shape and an inner mandrel for forming the inner facing into a cylindrical shape, which is of smaller diameter than that of the cylinder defined by the outer facing. The facings define a hollow core therebetween into which liquid foam reactants are injected through an injector.

21 Claims, 5 Drawing Sheets

INSULATING FOAM SECTIONS

This is a continuation of PCT/IE2003/000169 filed 12 Dec. 2003 and published in English.

INTRODUCTION

The invention relates to the processing of phenolic insulating foam sections, particularly suitable for pipe insulation.

Historically, phenolic resins have been the preferred thermosetting plastic material when low smoke emission and self-extinguishing ability in fire situations is paramount. One such application is in building and pipe insulation where phenolic foams provide both thermal insulation in use, and good performance during a fire.

Presently, such phenolic foam pipe-sections are prepared by producing a large foam block which is then subsequently cut into many pipe-section lengths using specialist cutting machinery. Modern techniques of computer analysis enable very efficient cutting of section shapes from such a block, but the commercial reality is that it is unusual and difficult in practice to obtain better than 60% recovery of good material from such a block.

Thus, conventional techniques create large quantities of waste foam—typically in excess of 40% of the block. This foam cannot easily be re-incorporated as a raw material because it is irreversibly cross-linked. It is possible to incorporate it as a raw material in other processes, but there is rarely enough produced on one site to make this worthwhile. Consequently the waste is often simply used for land-fill or incinerated. Both techniques incur a cost and land-fill is regarded in most countries as undesirable and is typically being increasingly taxed or phased out. Incineration sites are often unpopular locally and may become more difficult to access in the future.

For many years now there has been a search for an alternative to the block process for making phenolic insulation foam shapes suitable for pipe sections, without practical commercial success. Casting moulds can be used, individually or in carousels, but the process is slow and capital intensive as production volume is increased. The moulding process is only really viable for occasional sections such as elbows or bends.

STATEMENTS OF INVENTION

According to the invention there is provided a continuous process for producing elongate phenolic foam insulating shaped sections comprising the steps of:
  providing a first facing web;
  providing a second facing web;
  laying down liquid phenolic foam reactants between the webs;
  shaping the webs to conform the web and the foam mixture to a desired profile shape;
  heating the inner and outer webs; and
  supporting the webs to maintain the foam in the desired shape until the foam has cured to a shaped profile section.

In one embodiment the inner and outer webs are heated to a temperature of between 45° C. and 85° C. The inner and outer webs may be heated to a temperature of between 5° C. and 70° C.

In one embodiment the inner web is shaped by a mandrel. The mandrel may be heated. The mandrel may be a hollow mandrel which is heated by circulating a heat exchange fluid therethrough.

In one embodiment the mandrel is at least partially coated with an anti-friction agent such as Teflon.

In one embodiment the outer web is shaped by a mould. The mould may be heated. The mould may be heated by radiant heat.

In one embodiment the process includes the step of post-curing the elongate foam insulating shaped section.

The shaped section may be post cured at a temperature of from 20° C. and 85° C. for a period of 4 to 48 hours. The shaped sections may be post cured at a temperature of from 50° C. to 85° C. for a period of from 4 to 48 hours.

In one embodiment the process comprises cutting the shaped section to a desired length. The shaped section may be cut to a desired length in-line.

The elongate foam insulating shaped section may comprise a hollow foam body of substantially uniform cross section. The shaped section may be of curvilinear, preferably cylindrical shape.

The shaped section may be of rectilinear shape.

The foam body may comprise an insulating body for a pipe. Alternatively the foam body comprises a duct or an insulating body therefor. The foam body may comprise a pipe support.

In one embodiment the inner web is of metal foil such as aluminum foil, paper, glass, thermoplastic film or combinations of two or more thereof.

The outer web may be of metal foil such as aluminum foil, paper, glass, thermoplastic film or combinations of two or more thereof.

The invention also provides an elongate foam insulating shaped section whenever produced by a process of the invention.

In another aspect the invention provides an elongate shaped section comprising a hollow phenolic foam body of substantially uniform cross section, the foam body having an outer facing web and an inner facing web.

The foam body may be of curvilinear shape such as generally cylindrical. Alternatively the foam body is of rectilinear shape.

In one embodiment the body is slit longitudinally into section parts for wrapping around an object. The section parts may be linked by the outer web on one side. In one embodiment the facing ends of the section parts are faced with the inner facing web on an opposite side.

The foam body may comprise an insulating body for a pipe or may comprise a duct or an insulating body therefor or a pipe support.

According to another aspect the invention provides apparatus for use in continuous production of elongate phenolic foam insulating shaped sections of the type comprising an inner web, an outer web and an insulating foam between the webs, the apparatus comprising a mandrel for shaping the inner web and a mould for shaping the outer web wherein the mandrel is at least partially coated with a friction reducing material. Preferably the mandrel is substantially fully coated with friction reducing material. The friction reducing material may be Teflon.

According to a further aspect the invention provides an apparatus for use in continuous production of elongate phenolic foam insulating shaped sections of the type comprising an inner web, an outer web and an insulating foam between the webs, the apparatus comprising a machine frame, a mandrel for shaping the inner web and a mould for shaping the outer web wherein the mandrel is mounted to a movable carriage which in turn runs in a support track for the mandrel change-over, the track being supported on a mandrel mounting block which is adjustably mounted to the machine frame.

According to the invention there is provided a process for manufacturing continuous profiled insulating phenolic foam pipe-sections using phenolic foam reactants.

The term phenolic foam reactants means a resin substantially based on phenol formaldehyde to produce a substantially closed cell foam with stabiliser, plasticiser, blowing agent, surfactant, catalyst, and/or initiator system and possibly other ingredients including polyether or polyester polyol and/or isocyanurate.

The process involves the continuous feeding of facing webs, laying down of phenolic foam pre-polymer between these webs, and shaping the section continuously entering a double-chain shaped heated conveyor which enables the pre-polymer to cure as a shaped profile section.

The invention provides a process for continuously producing profiled sections of phenolic foam with surprisingly good retention of low thermal conductivity properties where desired. The process is capable of very low inherent waste and scrap rates as no waste section is produced, the waste being limited to cutting blade width and occasional scrap sections at machine start-up or during processing difficulties (which are naturally limited as the process can be stopped and started with ease).

The invention provides a continuous process for producing phenolic foam insulating pipe-sections with minimal waste involving the continuous feeding of facing webs, laying down of phenolic foam pre-polymer between these webs, and shaping the section continuously entering a double-belt shaped heated conveyor which enables the pre-polymer to cure as a shaped profile section.

Both the inner mandrel and outer mould sections may be heated to ensure adequate curing of the phenolic foam insulation in a commercially useful time at a rate exceeding 2 metres/minute, preferably exceeding 4 metres/minute.

The inner mandrel and outer mould sections enable a wide variety of sizes of pipe-section or similar continuously profiled phenolic foam insulating section to be produced.

A variety of phenolic resins and catalyst systems may be used to produce continuous pipe-section or other profiled insulating sections by this method.

The pipe sections may be post-cured at between 50 and 85° C. to produce product with good dimensional stability and stable thermal conductivity.

A variety of different facing materials including aluminium foil, paper, glass, thermoplastic film or a combination of these may be used.

BRIEF DESCRIPTION OF THE DRAWINGS

The invention will be more clearly understood from the following description thereof given by way of example only with reference to the accompanying drawings, in which.

DETAILED DESCRIPTION

Figure 1:
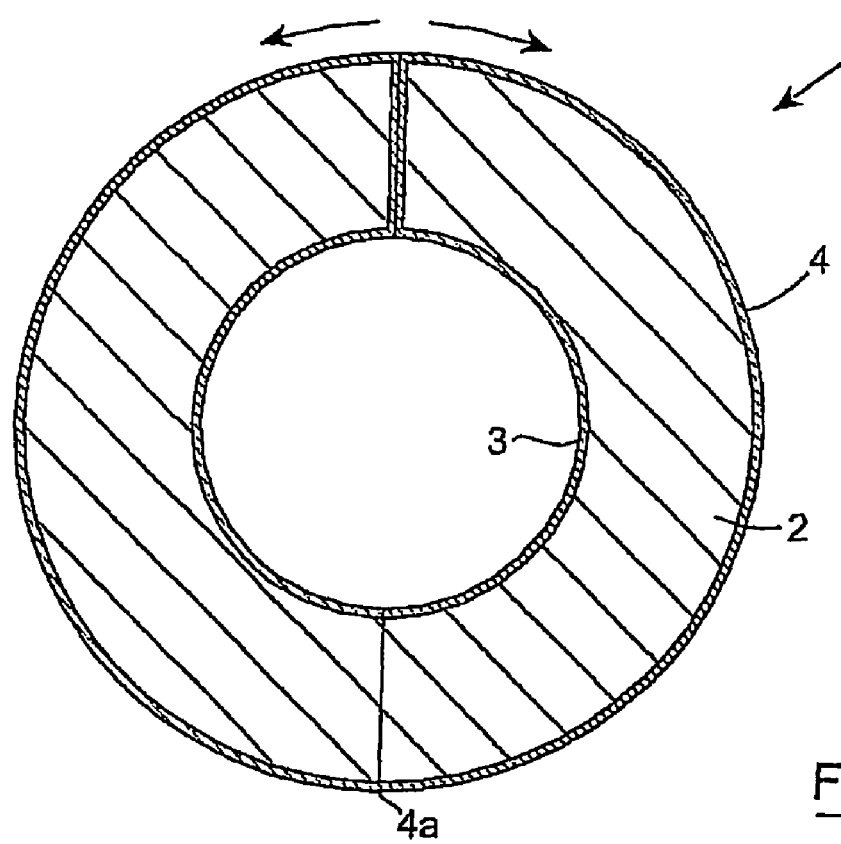
FIG. 1 is a cross sectional view of a phenolic foam insulating section according to the invention.
Figure 2:
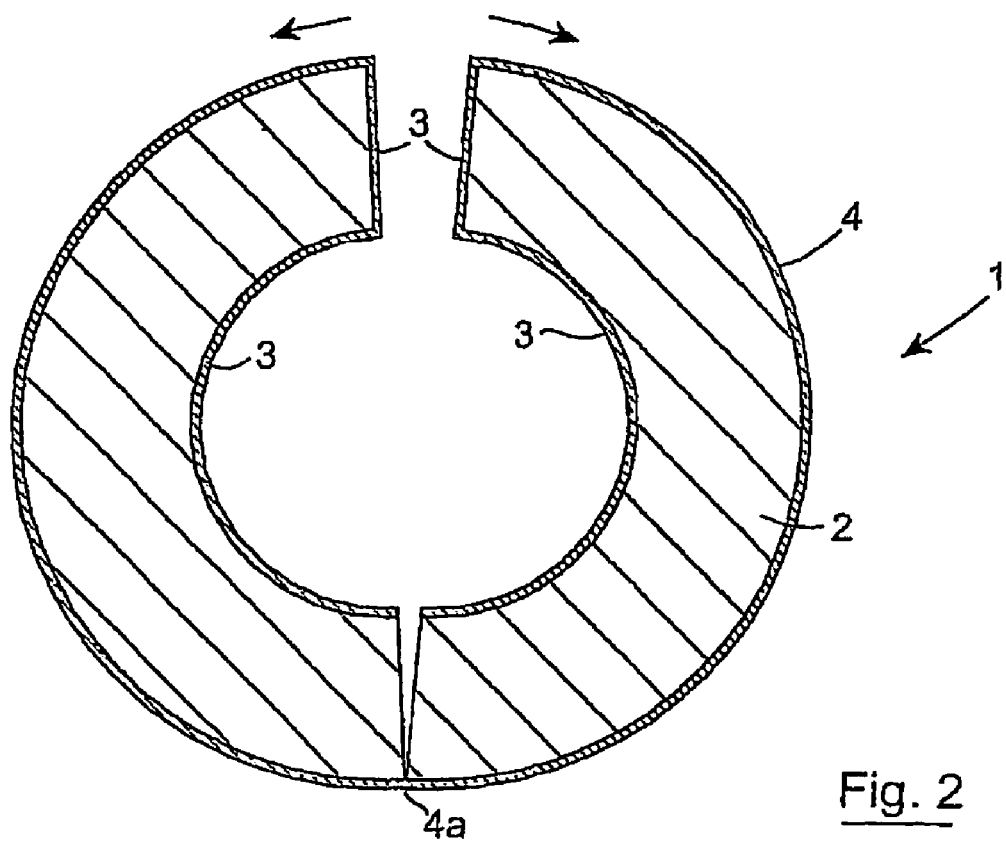
FIG. 2 is a cross sectional view of the insulating section of FIG. 1, partially open for fitting around a pipe.
Figure 3:
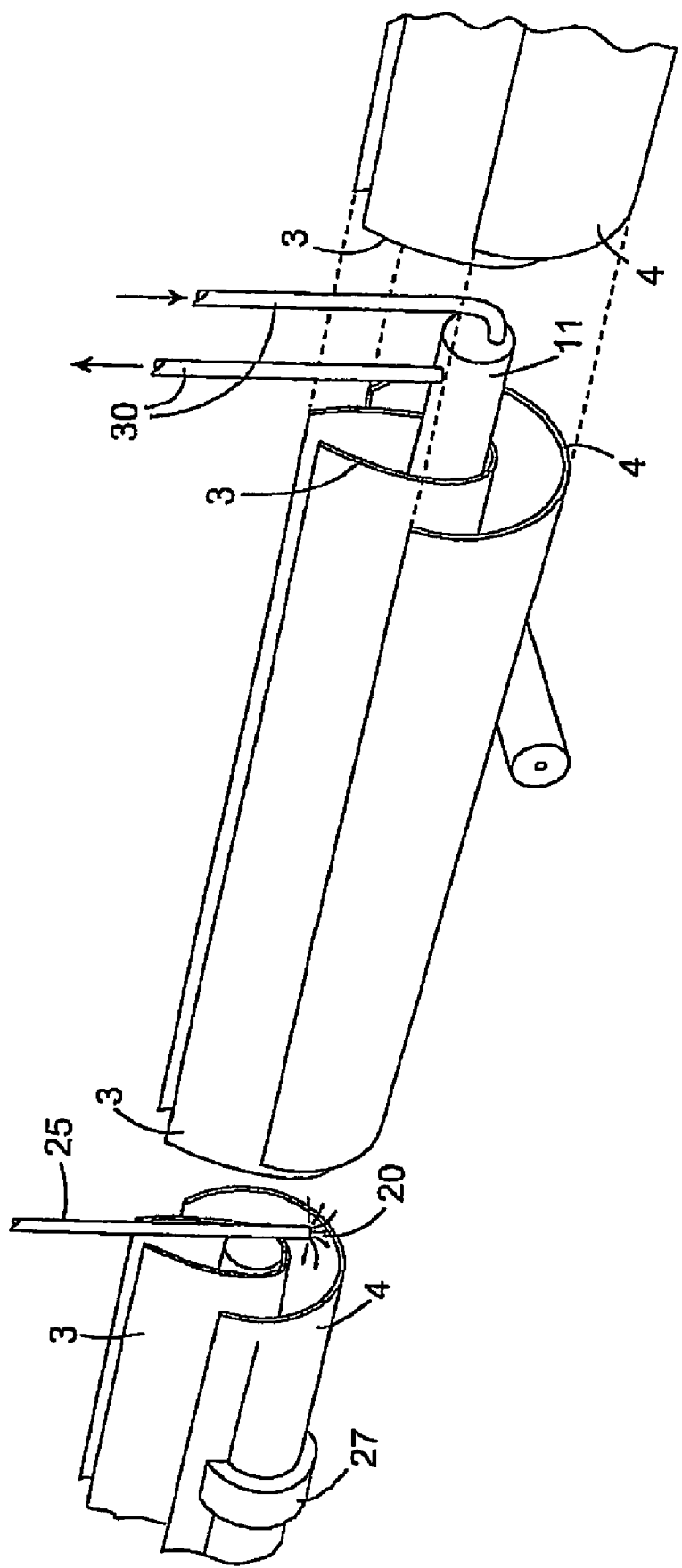
FIG. 3 is a diagrammatic view of an apparatus used in producing the insulating section of FIG. 1.

Referring to the drawings, and initially to FIGS. 1 and 2 thereof there is illustrated an elongate shaped phenolic section, in this case in the form of a pipe insulating section 1. The pipe insulating section comprises a generally cylindrical hollow phenolic foam body 2 of substantially uniform cross section with an inner facing web 3 and an outer facing web 4. It will be noted that in this case the phenolic foam body 2 is slit longitudinally to provide section halves which can be opened as illustrated in FIG. 2 to facilitate wrapping around a pipe to insulate the pipe. The section halves are linked by the outer web 4 at one side and facing ends of the section halves at the other end are faced with the inner facing web 3. The outer web 4 forms a hinge 4a at the joint between the section halves. The inner web 3 may be any suitable material such as paper and the other web 4 may be of any suitable material such as an aluminum foil.

Referring now to FIGS. 3 to 6 there is illustrated an apparatus used in manufacturing an elongate shaped phenolic section of the invention. The apparatus comprises an outer mould 10 for forming the outer facing 4 into a desired shape, in this case a cylinder, and a inner mandrel 11 for forming the inner facing 3 into a desired shape, in this case also a cylinder which is of smaller diameter than that of the cylinder defined by the outer facing 4. The facings 3, 4 define a hollow core therebetween into which liquid foam reactants 20 are injected through an injector 25.

Figure 4:
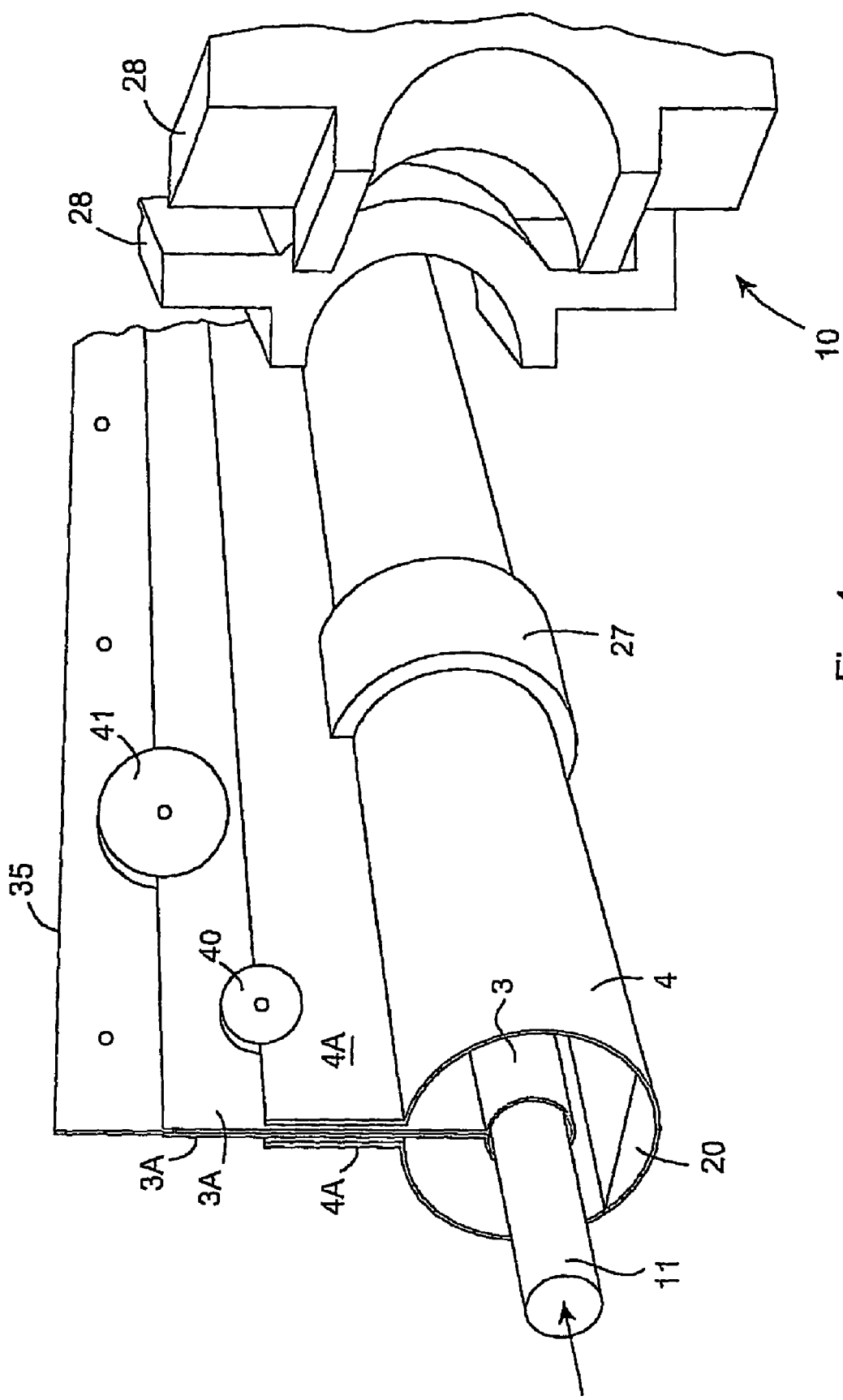
FIG. 4 is a perspective view of a detail of the apparatus of FIG. 3.
Figure 5:
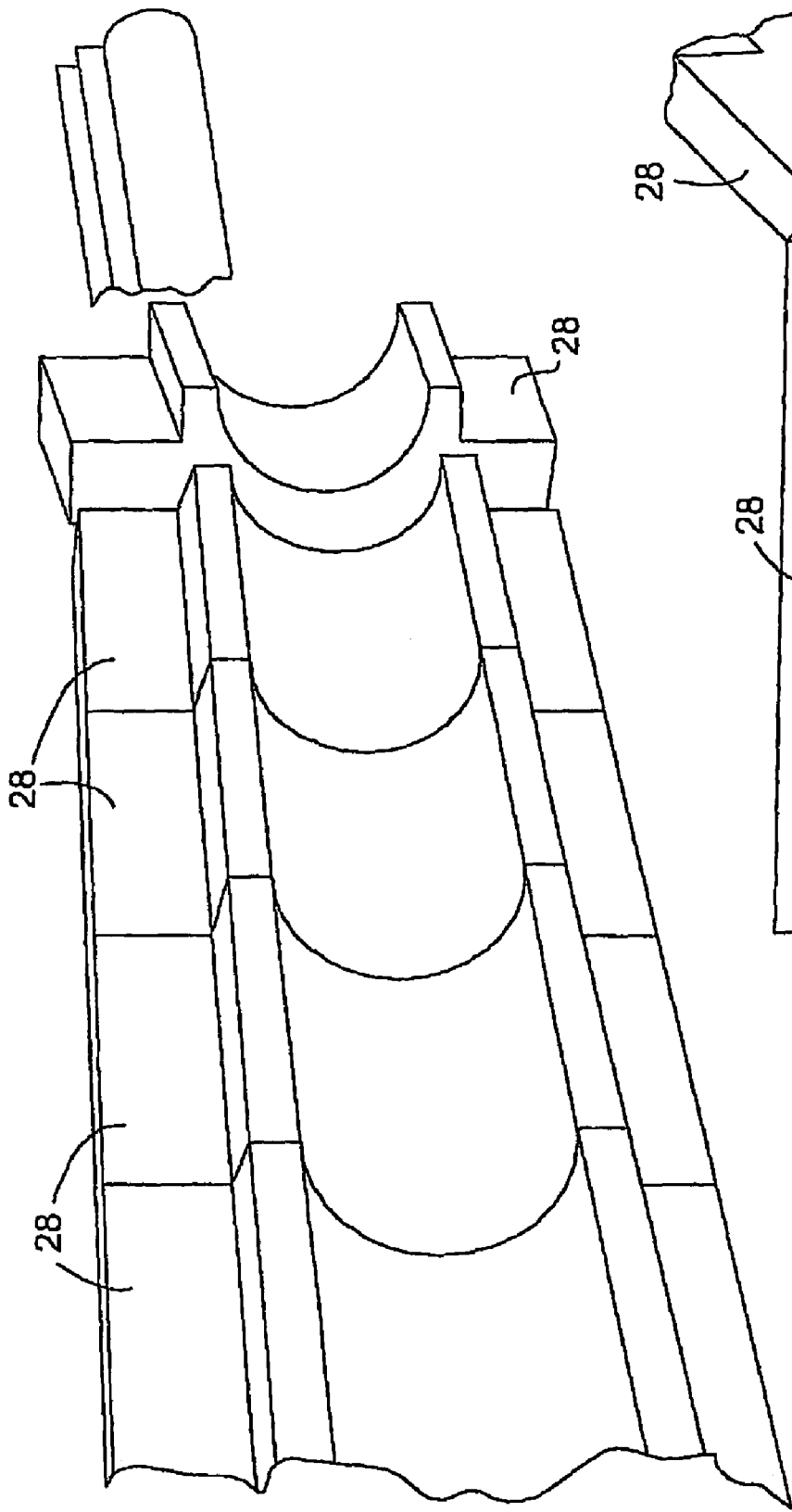
FIG. 5 is a perspective view of a heated mould detail of the apparatus.
Figure 6:
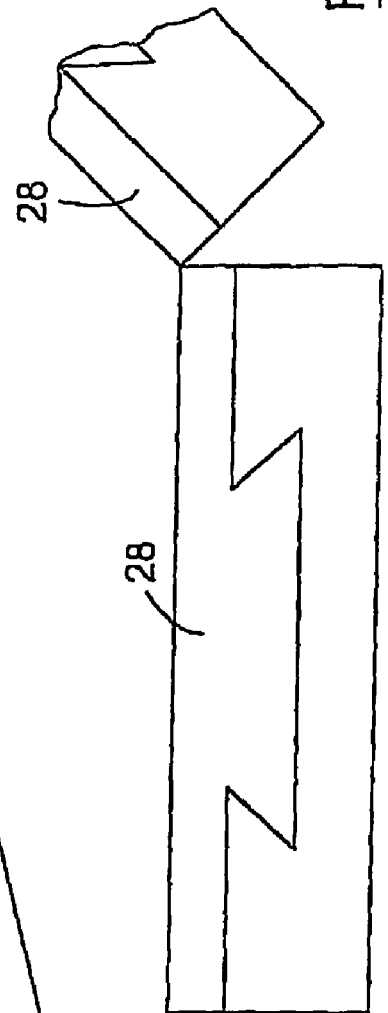
FIG. 6 is a plan view of a mould detail.

The outer facing 4 is led through a former 27 prior to entry to the mould 10. The mould 10 comprises a number of mould sections 28 which are interlinked as illustrated in FIGS. 4 to 6. The mould sections 28 are heated to a temperature of from 45° C. to 85° C., preferably between 50 and 70° C. using radiant heat. Similarly, the former 11 is heated to similar temperatures using a heat exchange medium such as hot water circulated through the former 11 to and from inlet/outlets 30.

The mandrel/former 11 has an upwardly projecting fin 35 over which excess inner facing 3A is led. The fin 35 is used to mount the mandrel 11 in the machine. The excess inner facing 3A is guided by a guide wheel 40 and the excess outer facing 4A is guided by a guide wheel 41.

The mandrel is preferably at least partially coated with a friction reducing material such as Teflon which is a Trade Mark of Du Pont. This has the effect of reducing the friction which acts between the moving web and the stationary mandrel. Such friction reducing measures are important because friction can cause the inner web to move more slowly than the outer web. The expanding foam lies between the webs and the differential movement of the webs may result in the cells of the foam becoming elongated with consequent adverse effects on the properties of the foam.

Figure 7:
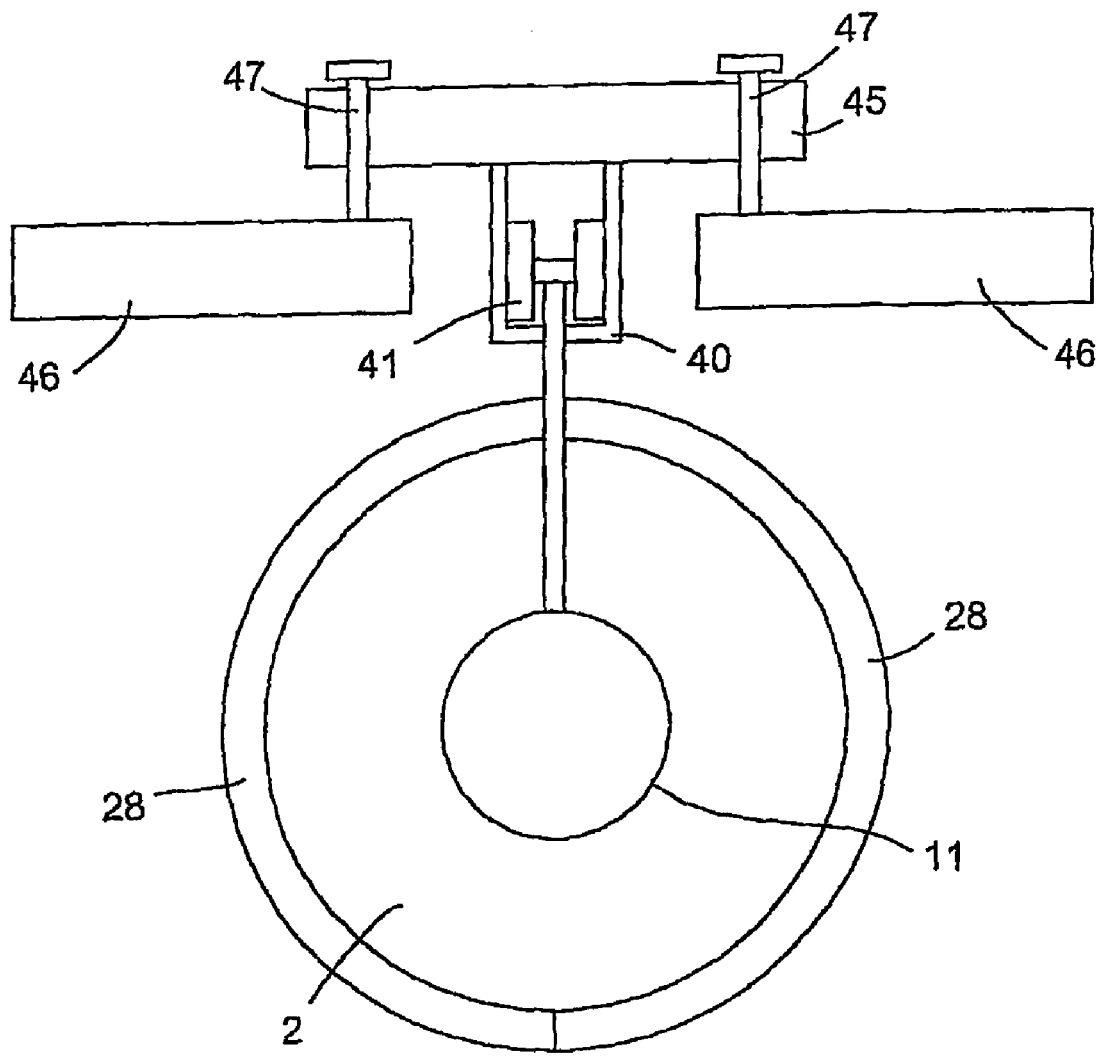
FIG. 7 is a diagrammatic cross sectional view illustrating the mounting of a mandrel.

Referring to FIG. 7 for ease of mandrel change over a mandrel 11 is located into a metal track 40 using a series of wheel carriages 41 along the length of the mandrel. The track 40 runs along the length of the machine. The track 40 is supported on a mandrel mounting block 45 which is in turn mounted to the machine frame 46 by adjustable mounting brackets 47.

The center line of each mandrel is designed to have exactly the same measurement in relation to the track so that when the mandrel is changed, the center point of the next mandrel is correctly aligned in relation to the moulds 28. Any changes to the position of the mandrel 11 are made by moving the track 40 in which it rests, thereby altering the effective position of all mandrels simultaneously.

A solution to the problem of continuous production of profiled insulated phenolic foam sections with minimal waste is provided by the invention.

In the invention, webs which form the facings 3, 4 are introduced and shaped immediately prior to laying down a pre-polymer mix onto the 'outer' web 4. The 'outer' web 4 is curled to fit inside the continuously rotated stiff mould sections 28 rotating on two chain systems either side on a central axis. These mould sections 28 form the shape of the outside of the pipe-section insulation profile, and are provided in short sections which can be readily changed to enable different outer diameter or shapes of profile. The mould sections 28 may be solid or hollow material, and may have means of electrical or liquid flow beating, or be heated separately by infra-red, conductive or air-flow means. Typically the mould sections 28 may be formed from wood, plastic or metal. The upper part of the mould sections 28 grip an excess 4A of the outer web facing 4, providing the traction to pull this along the central axis of the machine. The 'inner' web 3 is curled continuously around a central profiled mandrel 11 which extends part way along the central axis of the machine, but does not move with the outer chains, but remains static. The central mandrel 11 may be heated, normally using a liquid (water or oil) circulation system.

Phenol-formaldehyde resin is mixed with suitable surfactant, plasticiser, and blowing agent system, and with a fast-acting catalyst immediately prior to the mix being laid down through the nozzle 25 onto a continuously moving facing web 4 shaped to hold the mixture. The whole is fed continuously between the double chain system of moulds 28 so that the outer web 4 is held to the outer mould section shape, moving continuously at the same speed as these mould sections, and the inner web 3 slides over the inner heated mandrel 11. Several metres along the central axis of the machine, at the point where the resin mix has polymerised sufficiently to be self-supporting, the mandrel section 11 finishes. The final polymerisation and partial cure of the outer section then continues along the central axis of the machine and, at the point where the outside of the pipe-section is sufficiently cured, the mould sections 28 are parted on the double chain and returned to the beginning of the process along the outer sides of the machine. If the moulds 28 are not self heating, they may be heated just prior to the front of the machine by radiators placed along the outside.

The partly cured profile emerging continuously from the machine is cut into sections of suitable length for handling (typically 1 metre), slit continuously to allow folding over pipe lengths as described above, and collected in cassettes or boxes for further heat curing, if required.

By this method phenolic foam insulating pipe sections can be made continuously with much reduced waste and productivity over conventional procedures.

EXAMPLE 1

Phenolic formaldehyde resin supplied by Borden Chemicals, type J60/2325L was pre-mixed with 16 parts per hundred resin (pph) of 141b containing 10% PFA type P5050. This was continuously fed into a low pressure dynamic mixer to which 65% phenol sulphonic acid was added at a rate of 25 pph. The resultant pre-polymer was fed onto a continuously moving facing web shaped to hold the mixture. The whole was fed continuously at 2.5 metres/minute between a 12 metre double chain system of moulds so that the outer web was held to the outer mould section shape (diameter 74 mm) as described above, moving continuously at the same speed as these mould sections, and the inner web slid over the inner heated mandrel (diameter 38 mm), which projected 8 metres along the central axis of the machine. The inner mandrel was heated to 60° C. and the outer mould sections to 50° C.

The partly cured profile emerging continuously from the machine was cut into sections of suitable length for handling (1 metre), slit continuously to allow folding over pipe lengths, and collected in boxes for further heat curing. The sections thus produced showed good dimensional stability and thermal conductivity suitable for use as pipe section insulation.

The invention is not limited to insulating sections for pipes or ducts. It may be used, for example, to produce short lengths (typically 50 mm to 250 mm) of similar shape with higher density for use as a support or the lice. Such densities would typically lie in the range of from 50 kg/m$^3$ to 125 kg/m$^3$ and the material produced has sufficient compressive strength to be able to support a pipe system which may be insulated by the insulated pipe sections of the invention. Products of this type are known as pipe supports.

The invention is not limited to the embodiments hereinbefore described which may be varied in detail.

The invention claimed is:

1. A continuous process for producing elongate phenolic foam insulating shaped sections, said process comprising the steps of:
    providing a moving first inner facing web;
    providing a moving second outer facing web;
    laying down liquid phenolic foam reactants between the moving webs;
    shaping the moving second outer facing web by using a mould, the mould including a number of interlinked moving mould sections;
    shaping the moving first inner facing web by using a stationary hollow mandrel, the stationary hollow mandrel having opposite closed ends and an inlet pipe and an outlet pipe connected to the stationary hollow mandrel for circulating a heat exchange fluid by the inlet pipe and the outlet pipe;
    heating the stationary hollow mandrel and thereby curing the foam surrounding an exterior of the stationary hollow mandrel at a rate of movement of the foam exceeding two meters per minute by circulating the heat exchange fluid contained entirely within the stationary hollow mandrel as the heat exchange fluid is passed through the inlet pipe and the heat exchange fluid is removed through the outlet pipe;
    simultaneously heating the first inner facing web by passing the heat exchange fluid through the mandrel at a first temperature from 45° C. to 85° C. and heating the second outer facing web by heating the mould sections to a second temperature, the second temperature being lower than the first temperature;
    moving the mould sections to draw the second outer facing web along; and
    supporting the webs to maintain the foam in a desired elongated shape until the foam has cured to a shaped profile section.

2. The process as claimed in claim 1 wherein the inner and outer webs are heated to a temperature of between 50° C. and 70° C.

3. The process as claimed in claim 1 wherein the mandrel is at least partially coated with an anti-friction agent.

4. The process as claimed in claim 3 wherein the anti-friction agent is a PTFE coating.

5. The process as claimed claim 1 wherein the mould is heated by radiant heat.

6. The process as claimed in claim 1 including the step of post-curing the shaped profile section.

7. The process as claimed in claim 6 wherein the shaped section is post cured at a temperature of from 20° C. and 85° C. for a period of 4 to 48 hours.

8. The process as claimed in claim 6 wherein the shaped section is post cured at a temperature of from 50° C. to 85° C. for a period of from 4 to 48 hours.

9. The process as claimed in claim 1 further comprising cutting the shaped section to a desired length.

10. The process as claimed in claim 9 wherein the shaped section is cut to a desired length in-line.

11. The process as claimed in claim 1 wherein the shaped profile section includes a hollow foam body.

12. The process as claimed in claim 11 wherein the hollow body is of substantially uniform cross section.

13. The process as claimed in claim 11 wherein the shaped section is of curvilinear shape.

14. The process as claimed in claim 13 wherein the shaped section is of cylindrical shape.

15. The process as claimed in claim 11 wherein the shaped section is of rectilinear shape.

16. The process as claimed in claim 1 wherein the shaped profile section defines an insulating body for a pipe.

17. The process as claimed in claim 1 wherein the shaped profile section defines a duct or an insulating body therefor.

18. The process as claimed in claim 1 wherein the inner web is selected from the group consisting of aluminum foil, paper, glass, thermoplastic film or combinations of two or more thereof.

19. The process as claimed in claim 1 wherein the outer web is selected from the group consisting of aluminum foil, paper, glass, thermoplastic film or combinations of two or more thereof.

20. The process as claimed in claim 1, wherein the first temperature is 60° C.

21. The process as claimed in claim 20, wherein the second temperature is 50° C.

* * * * *